(12) United States Patent
Tolentino et al.

(10) Patent No.: US 11,840,201 B2
(45) Date of Patent: Dec. 12, 2023

(54) WIPER BLADE WITH COVER

(71) Applicant: Pylon Manufacturing Corp., Deerfield Beach, FL (US)

(72) Inventors: Vambi Raymundo Tolentino, Laguno (PH); Robert Peter Peers, Boca Raton, FL (US)

(73) Assignee: PYLON MANUFACTURING CORP., Deerfield Beach, FL (US)

( * ) Notice: Subject to any disclaimer, the term of this patent is extended or adjusted under 35 U.S.C. 154(b) by 0 days.

(21) Appl. No.: 17/479,712

(22) Filed: Sep. 20, 2021

(65) Prior Publication Data

US 2022/0001840 A1 Jan. 6, 2022

Related U.S. Application Data

(63) Continuation of application No. 16/673,543, filed on Nov. 4, 2019, now Pat. No. 11,124,158, which is a continuation of application No. 14/928,467, filed on Oct. 30, 2015, now Pat. No. 10,464,533, which is a continuation of application No. 13/587,389, filed on Aug. 16, 2012, now Pat. No. 9,174,609, which is a continuation-in-part of application No. 13/572,100, filed on Aug. 10, 2012, now abandoned, and a continuation-in-part of application No. 13/453,601, filed on Apr. 23, 2012, now Pat. No. 9,457,768.

(60) Provisional application No. 61/560,977, filed on Nov. 17, 2011, provisional application No. 61/561,098, filed on Nov. 17, 2011, provisional application No. 61/524,145, filed on Aug. 16, 2011, provisional application No. 61/522,091, filed on Aug. 10, 2011, provisional application No. 61/477,908, filed on Apr. 21, 2011.

(51) Int. Cl.
- *B60S 1/40* (2006.01)
- *B60S 1/04* (2006.01)
- *B60S 1/38* (2006.01)

(52) U.S. Cl.
CPC ............... *B60S 1/40* (2013.01); *B60S 1/0491* (2013.01); *B60S 1/38* (2013.01); *B60S 1/3806* (2013.01); *B60S 1/3849* (2013.01); *B60S 1/3863* (2013.01); *B60S 1/381* (2013.01); *B60S 1/3851* (2013.01); *B60S 1/3858* (2013.01); *B60S 1/3867* (2013.01); *B60S 2001/3843* (2013.01)

(58) Field of Classification Search
CPC .................. B60S 1/3806; B60S 1/3851; B60S 2001/3843
See application file for complete search history.

(56) References Cited

U.S. PATENT DOCUMENTS 7,461,429 B2 * 12/2008 Huang .................. B60S 1/3806
15/250.43

* cited by examiner

*Primary Examiner* — Andrew A Horton
(74) *Attorney, Agent, or Firm* — BAKERHOSTETLER

(57) ABSTRACT

A cover for windshield wiper blades having an elongate body with a central collar and first and second elongate portions extending from the central collar. The first and second elongate portions having outer ends, and the central collar defining an interior passageway having a snap-fit tongue. A channel is disposed along each of the first and second elongate portions extending from the central collar towards the outer ends; and an end retainer or other securing mechanism is located at the outer ends. Also, windshield wiper blades incorporating such covers.

18 Claims, 24 Drawing Sheets

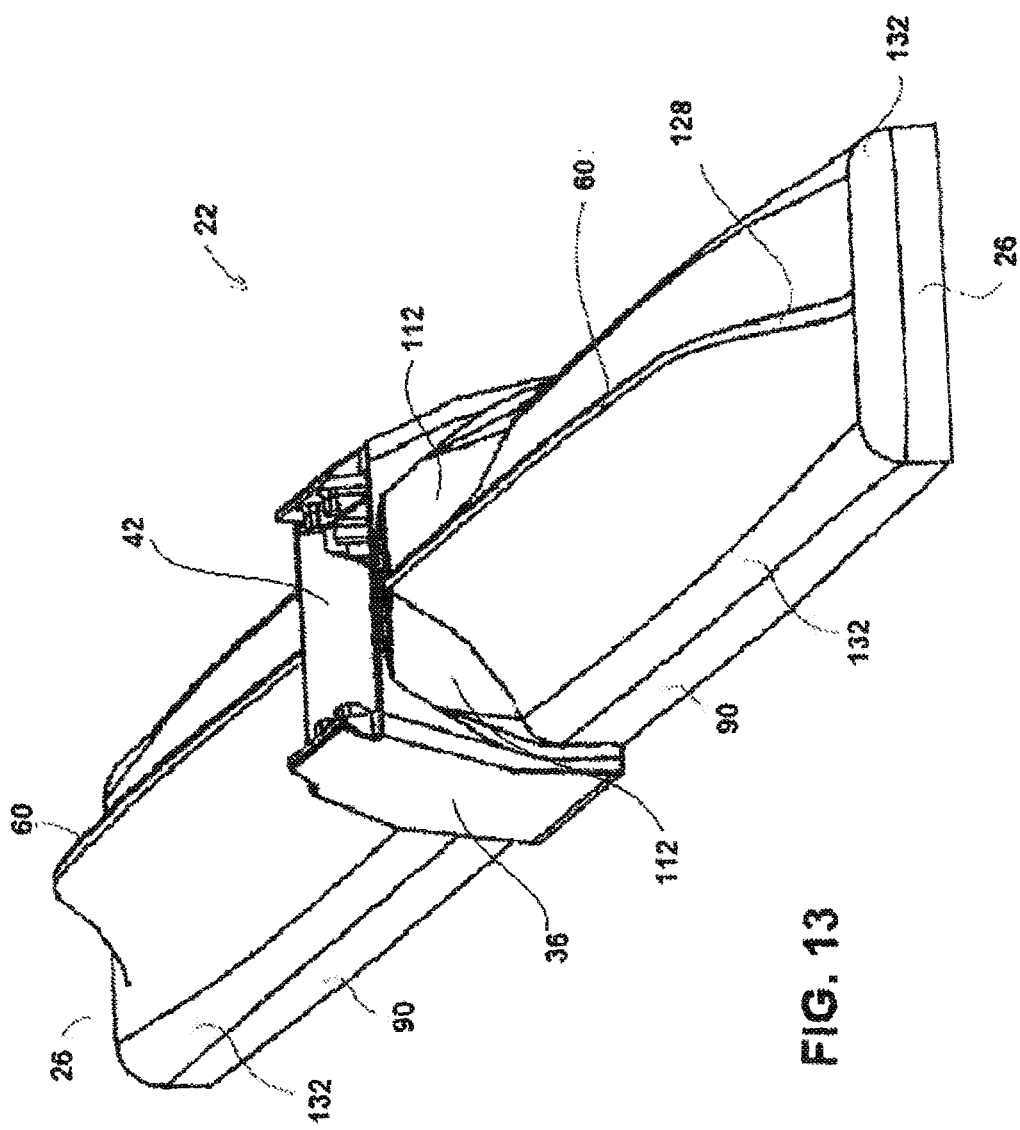

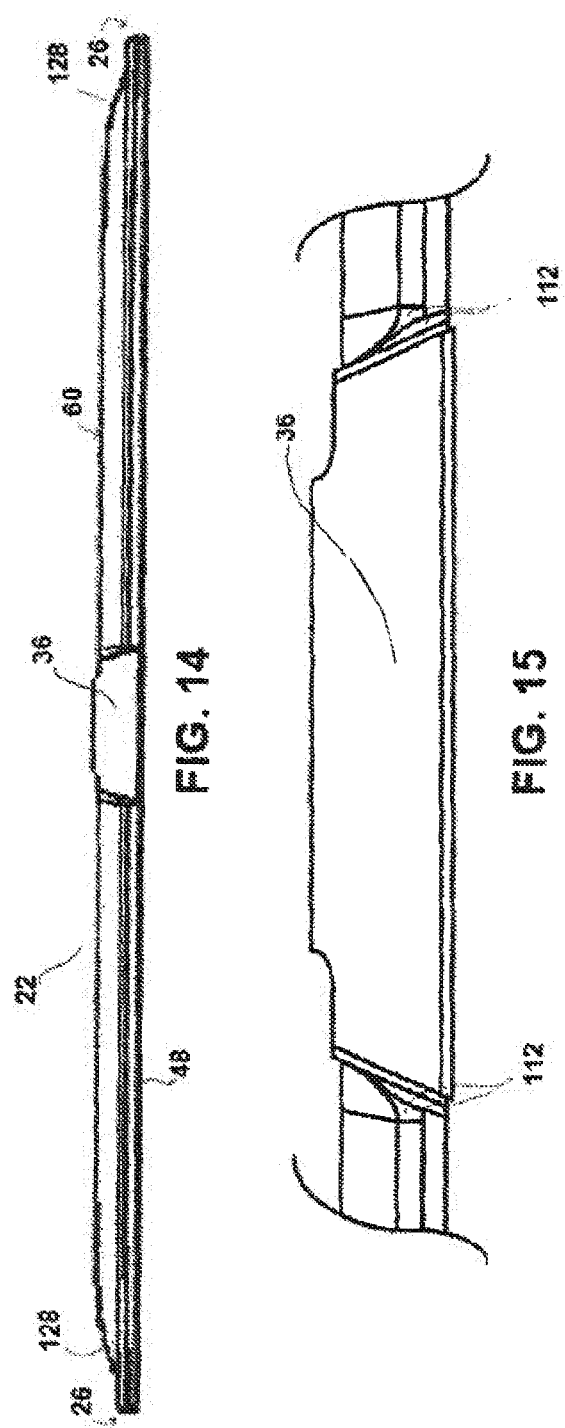

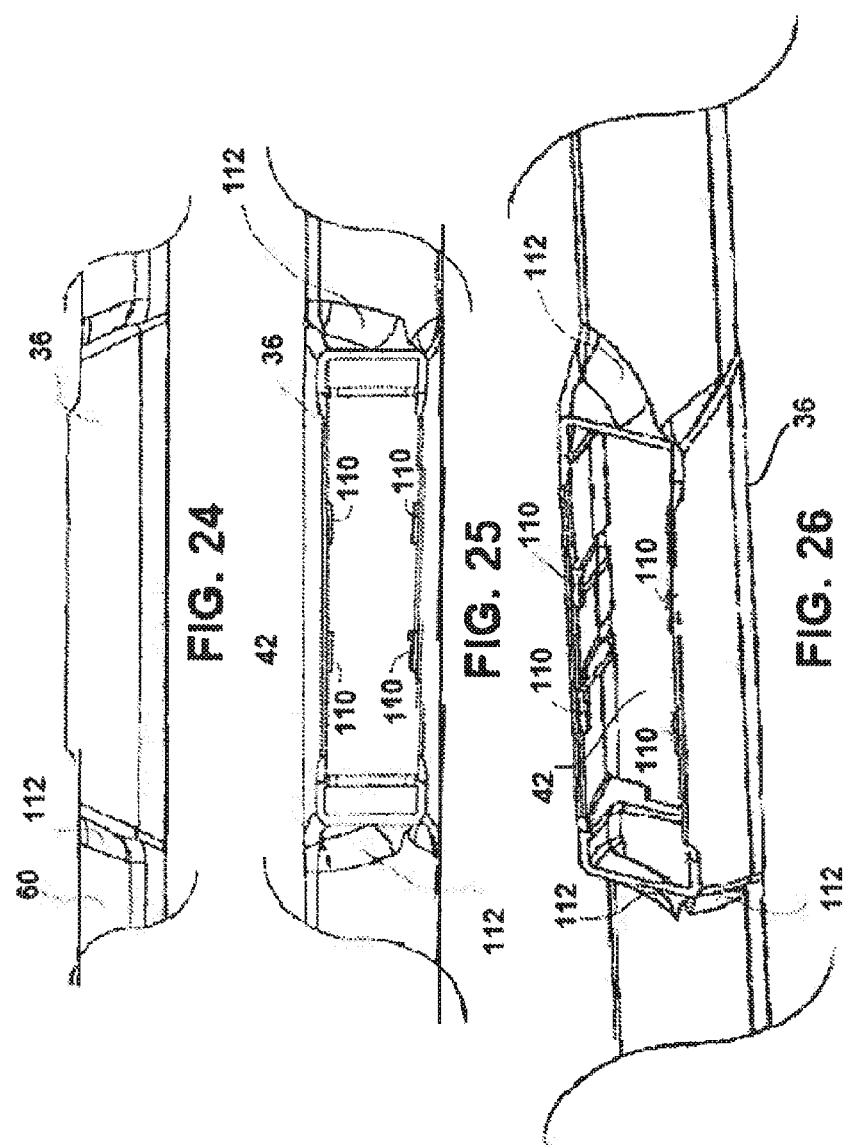

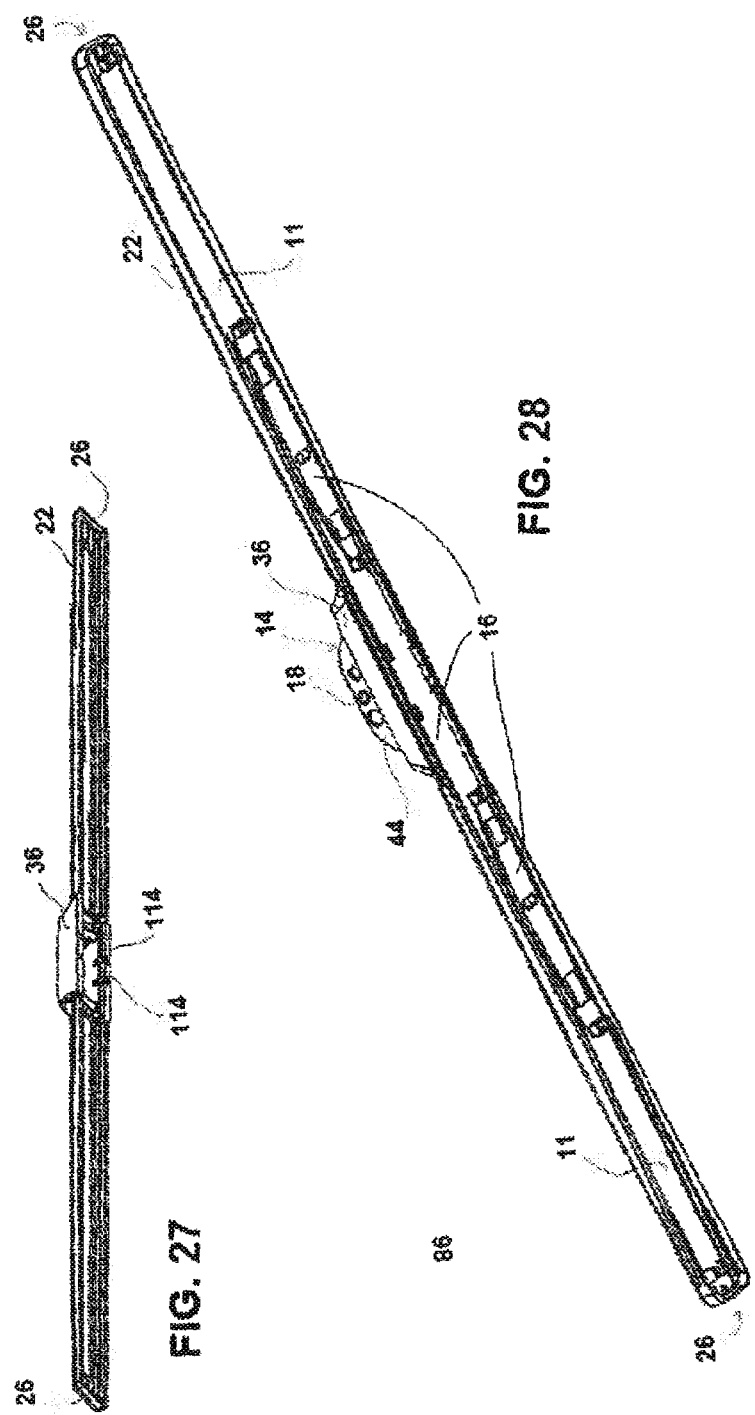

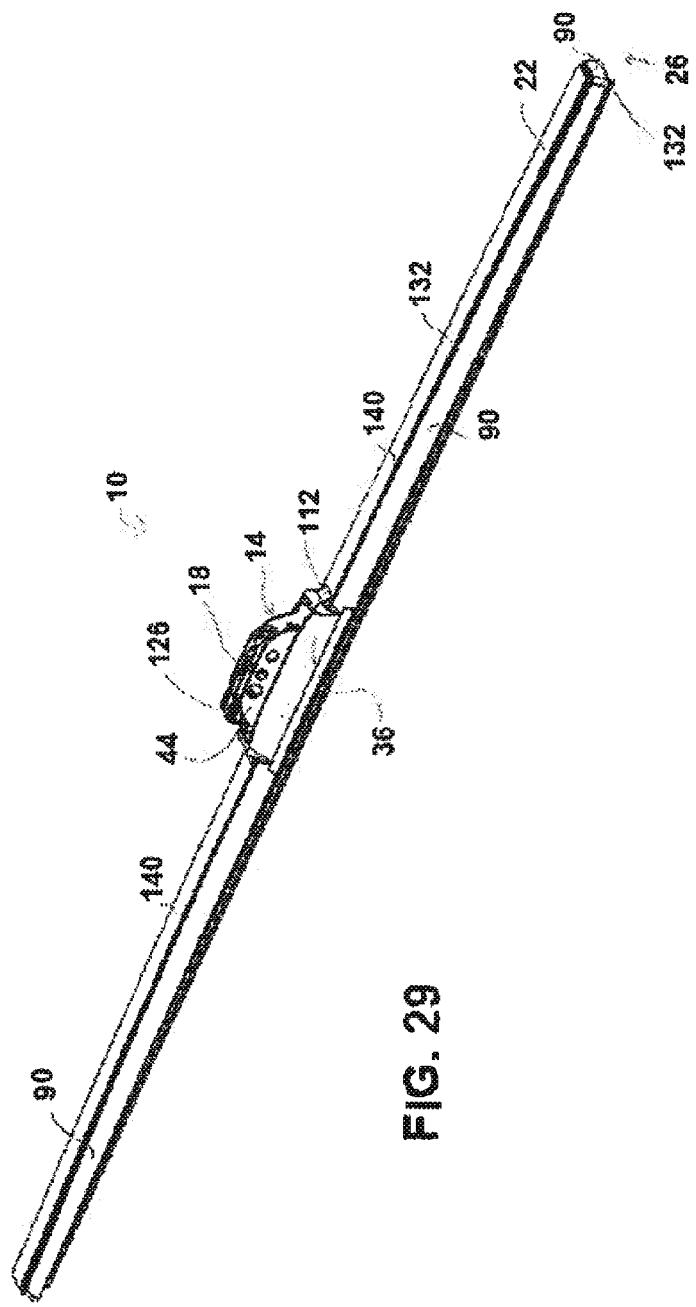

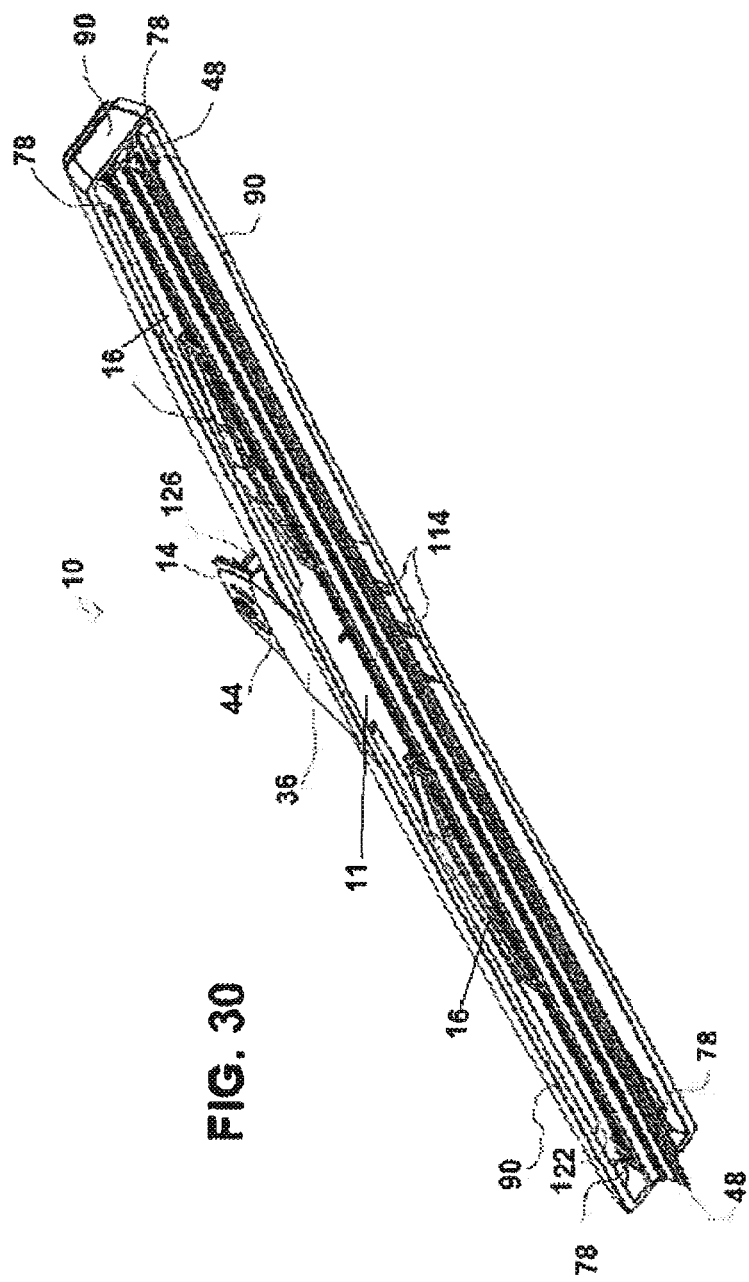

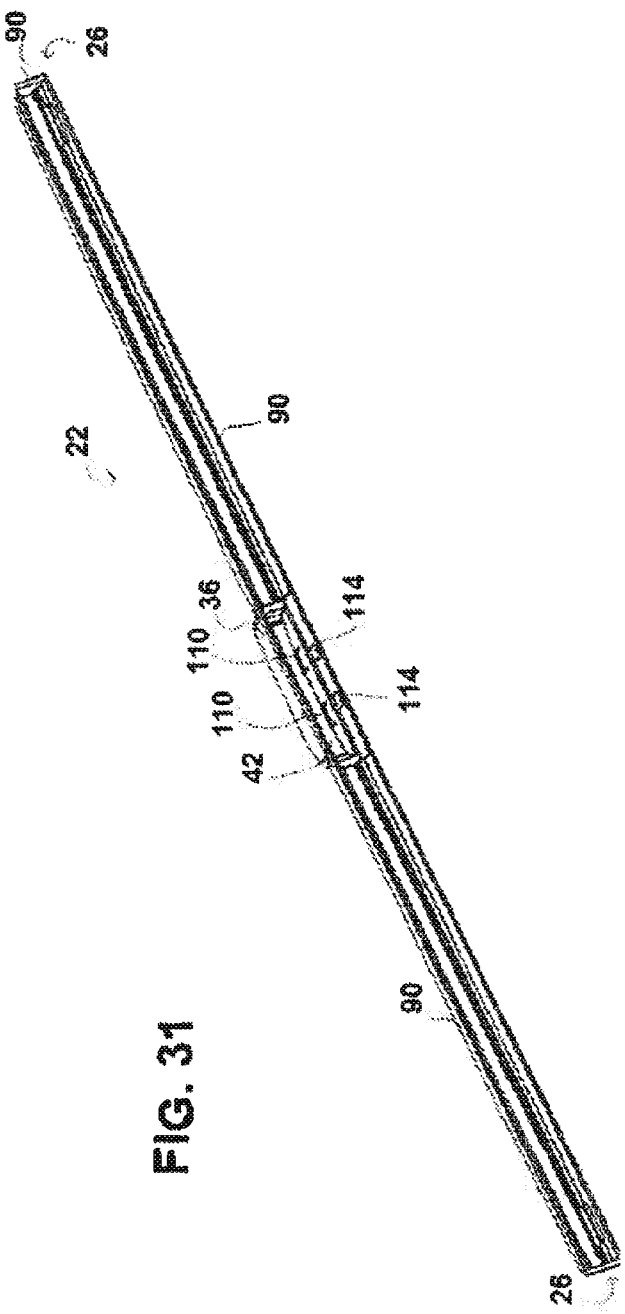

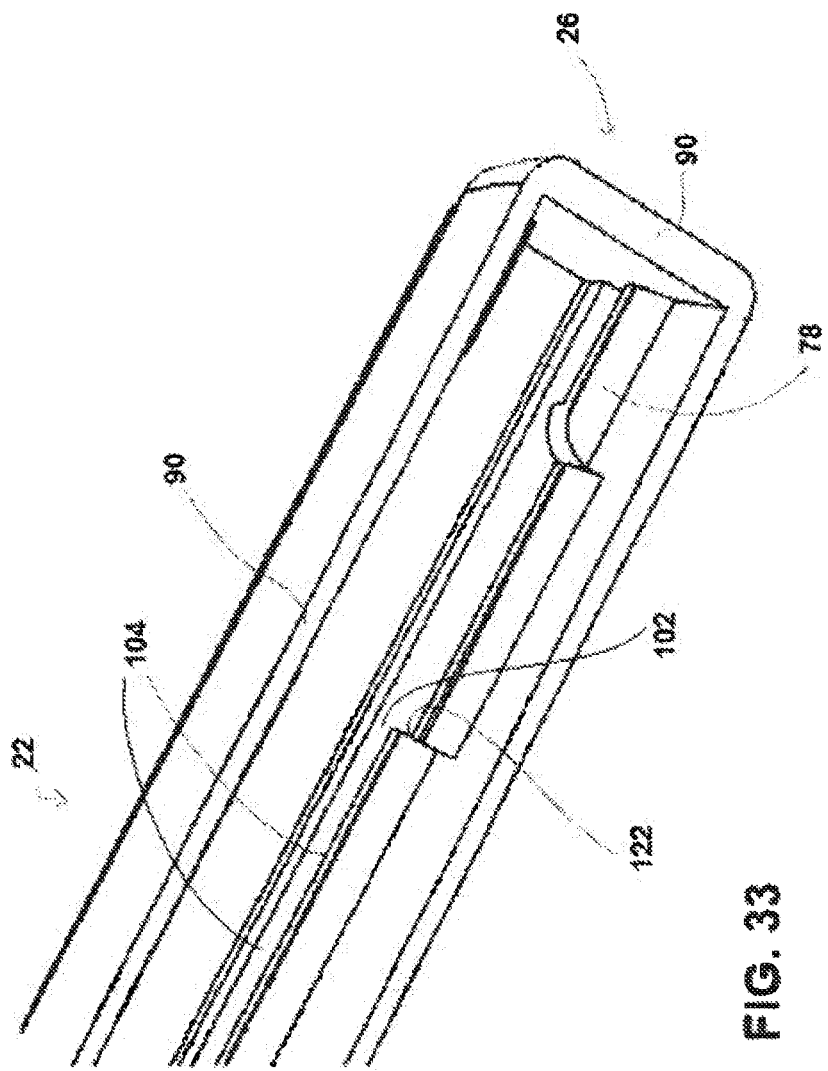

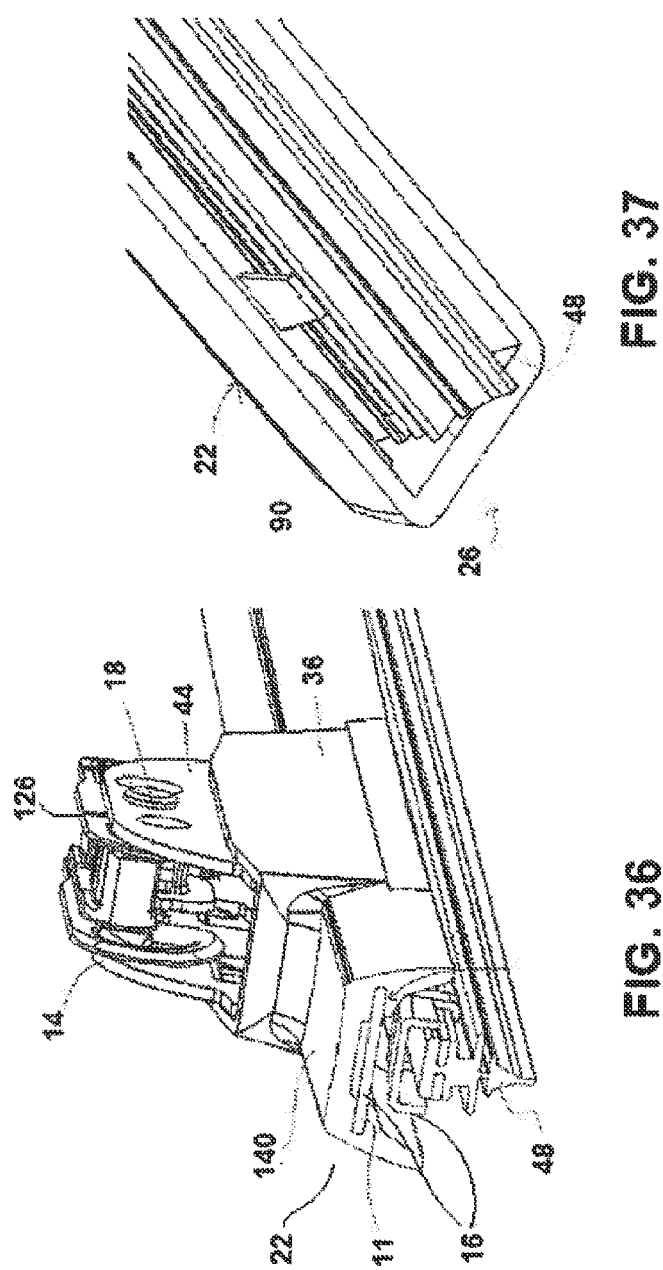

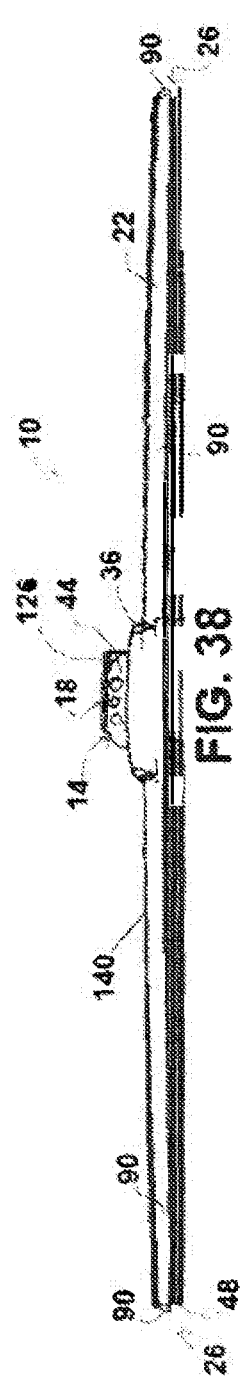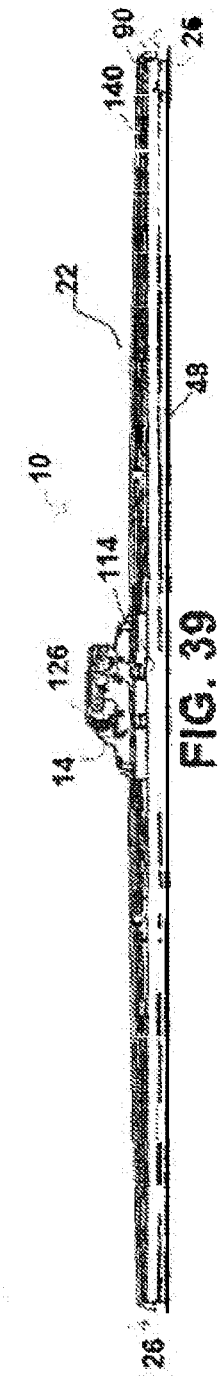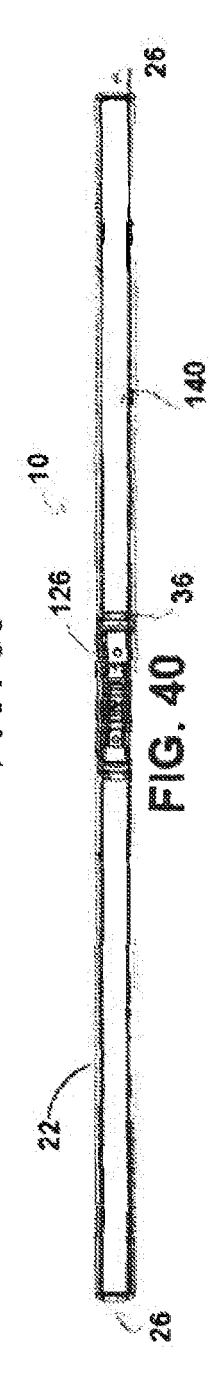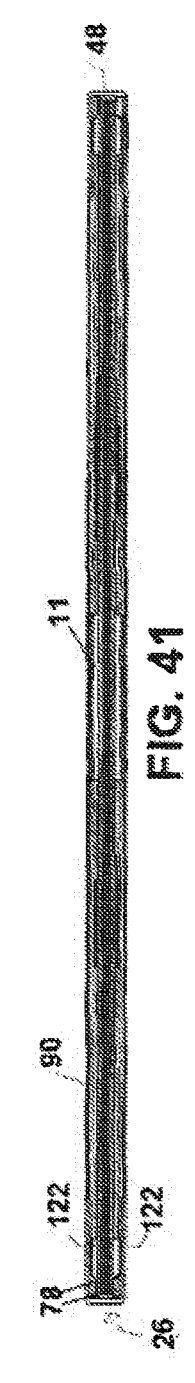

WIPER BLADE WITH COVER

CROSS-REFERENCE TO RELATED APPLICATIONS

This Application is a continuation of U.S. application Ser. No. 16/673,543, filed on Nov. 4, 2019, which is a continuation of U.S. application Ser. No. 14/928,467, filed on Oct. 30, 2015, which is a continuation of U.S. application Ser. No. 13/587,389 filed on Aug. 16, 2012, which claims the benefit of U.S. Provisional Application No. 61/524,145 filed Aug. 16, 2011 and U.S. Provisional Application No. 61/561,098 filed Nov. 17, 2011 and is a continuation-in-part of U.S. patent application Ser. No. 13/572,100 filed Aug. 10, 2012 which claims the benefit of U.S. Provisional Application No. 61/522,091 filed Aug. 10, 2011 and U.S. Provisional Application No. 61/560,977 filed Nov. 17, 2011 and is also a continuation-in-part of U.S. patent application Ser. No. 13/453,601 filed Apr. 23, 2012 which claims the benefit of U.S. Provisional Application No. 61/477,908 filed Apr. 21, 2011. The disclosures of each of the aforementioned applications are hereby incorporated herein by reference in their entireties.

FIELD OF THE INVENTION

This invention relates to the field of windshield wiper blades having a covered portion.

BACKGROUND OF THE INVENTION

Basic windshield wipers used on vehicles have a blade portion that contacts the windshield, a frame that supports the wiper strip, and a connection device for attaching the blade to a wiper arm. Presently, three principle styles of windshield wipers are in wide-scale use. The first style is the traditional frame windshield wiper, which implements a multi-piece frame that is directly connected to the wiper arm. The second style is the beam blade windshield wiper, which has a unitary beam that supports the wiper blade and is directly connected to the wiper arm. Wiper blades of this type are described in U.S. Patent Application No. 61/477,908, which is incorporated by reference herein in its entirety. The third style is the hybrid blade windshield wiper, which combines the multi-piece frame and the unitary beam frame. Wiper blades of this type are described in U.S. Patent Publication No. US 2010/0236008, which is incorporated herein by reference in its entirety.

One problem common among many windshield wipers is a tendency to separate from the windshield during use, thus resulting in an uneven or inconsistent clearing of the windshield. This happens when a windshield wiper encounters a vehicle's slipstream and downward force on the wiper blade is overcome by wind lift created by the wiper blade. The wind lift problem has been known in the wiper field for decades, and many attempts have been made to resolve it. For example, see U.S. Pat. Nos. 3,056,991, 3,317,945, 3,879,793, 3,942,212, 6,292,974, 6,944,905, which are incorporated herein by reference in their entirety.

To minimize the wind lift problem, covers that create desired aerodynamic characteristics are added to the top of windshield wipers. Beam blade and hybrid blade windshield wipers generally incorporate three or more deflectors or covers. Specifically, a first cover is provided between one end of the windshield wiper and the central connection device. A second cover is provided between the other end of the windshield wiper and the central connection device. And a third cover is provided over the central connection device.

Despite the significant performance, aerodynamic and aesthetic improvements created by the use of covers, these windshield wipers still have significant shortcomings. One significant problem is that the use of covers increases the material and assembly costs for each windshield wiper. Another problem is that covers are prone to unwanted separation or detachment from the windshield wiper. Separation often occurs when the vehicle is moving through inclement weather and as a result covers are frequently lost. Once a cover is lost, the performance and aesthetic qualities of the windshield wiper are significantly impaired.

Yet another problem with windshield wipers, and in particular windshield wipers with covers, is that covers can result in high profile or interrupted profile regions. Such regions can create aerodynamic turbulence or vortices that result in wind noise. This occurs as wind contacts any high profile or interrupted profile regions of the covered windshield wiper. The wind noise created from wiper blades encountering the slip stream is distracting and makes for a less comfortable overall driving experience. Reduction of such wind noise is therefore a constant concern associated with wiper blade design.

BRIEF SUMMARY OF THE INVENTION

The foregoing problems of prior windshield wipers are resolved or at least substantially reduced and a technical advance is achieved in a windshield wiper that reduces or eliminates windshield wiper cover separation, high profile or interrupted profile regions.

According to one embodiment of the present invention, a windshield wiper having an elongate cover with an elastomeric region and a central collar is provided. The central collar is mounted over a mounting base, or other connection device of the windshield wiper. In addition, the elongate cover is provided with attachment mechanisms at its ends to secure the ends to corresponding ends of the windshield wiper.

According to another embodiment of the present invention, a windshield wiper having aerodynamically contoured cover with an elastomeric region and an aerodynamically contoured central collar is provided. The central collar is mounted over a mounting base, or other connection device of the windshield wiper. In addition, the aerodynamically contoured cover is provided with contoured attachment mechanisms at its ends to secure the ends to corresponding ends of the windshield wiper.

According to yet another embodiment of the present invention, a windshield wiper having a cover defining a substantially planar upper region and rectilinear seams connecting the upper region to a planar skirt. The cover is further provided with an elastomeric region and a central collar. The central collar is mounted over a mounting base, or other connection device of the windshield wiper. In addition, the cover is provided with chop attachment mechanisms at its ends to secure the ends to corresponding ends of the windshield wiper.

Exemplary embodiments of windshield wipers having an elongate cover with a central collar are attached hereto as examples of the invention.

BRIEF DESCRIPTION OF THE DRAWINGS

FIG. 13 illustrates a perspective side view of a second embodiment of an elongate windshield wiper cover according to one aspect of the present invention;

FIG. 14 illustrates a side view of a first embodiment of an elongate windshield wiper cover according to one aspect of the present invention;

FIG. 15 illustrates a cutaway side view of a second embodiment of an elongate windshield wiper cover according to one aspect of the present invention;

FIG. 24 illustrates a cutaway side view of a third embodiment of an elongate windshield wiper cover according to one aspect of the present invention;

FIG. 25 illustrates a cutaway top view of a third embodiment of a windshield wiper cover according to one aspect of the present invention;

FIG. 26 illustrates a cutaway perspective view of a third embodiment of a windshield wiper cover according to one aspect of the present invention;

FIG. 27 illustrates a perspective bottom view of a third embodiment of a windshield wiper cover according to one aspect of the present invention;

FIG. 28 illustrates a perspective bottom view of a third embodiment of a hybrid windshield wiper according to one aspect of the present invention;

FIG. 29 illustrates a perspective side view of a fourth embodiment of an elongate windshield wiper according to one aspect of the present invention;

FIG. 30 illustrates a perspective bottom view of a fourth embodiment of an elongate windshield wiper according to one aspect of the present invention;

FIG. 31 illustrates a perspective bottom view of a fourth embodiment of an elongate windshield wiper cover according to one aspect of the present invention;

FIG. 33 illustrates a cutaway perspective bottom view of a fourth embodiment of an elongate windshield wiper cover end according to one aspect of the present invention;

FIG. 36 illustrates a cutaway perspective side view of a fourth embodiment of a windshield wiper having a collar according to one aspect of the present invention;

FIG. 37 illustrates a cutaway perspective bottom view of a fourth embodiment of a windshield wiper cover end according to one aspect of the present invention;

FIG. 38 illustrates a side view of a fourth embodiment of a windshield wiper according to one aspect of the present invention;

FIG. 39 illustrates a cross-section side view of a fourth embodiment of a windshield wiper according to one aspect of the present invention;

FIG. 40 illustrates a top view of a fourth embodiment of a windshield wiper according to one aspect of the present invention; and FIG. 41 illustrates a bottom view of a fourth embodiment of a windshield wiper according to one aspect of the present invention.

DETAILED DESCRIPTION OF THE INVENTION

The following detailed description and the appended drawings describe and illustrate exemplary embodiments of the invention solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

Figure 4:
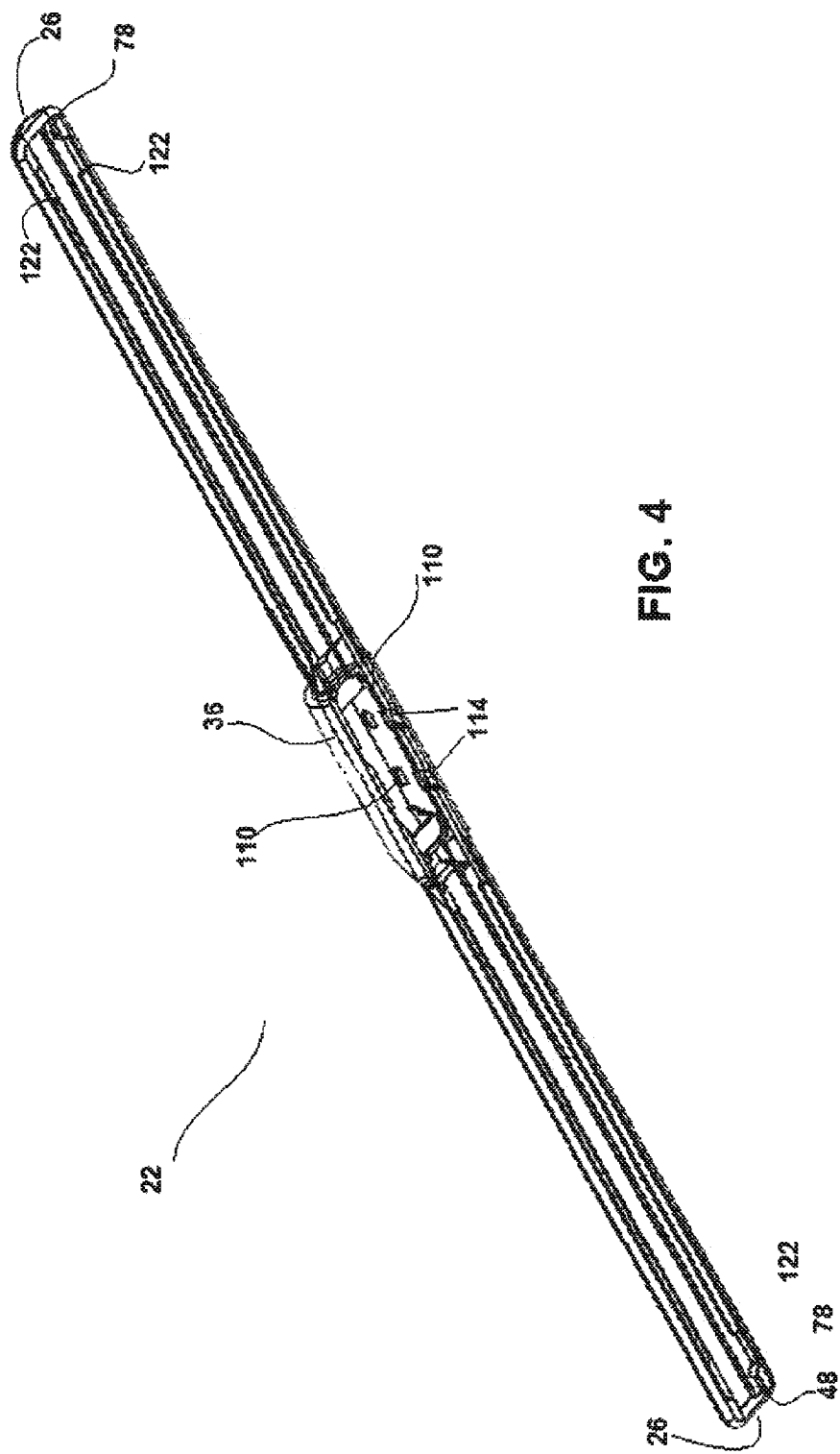
FIG. 4 illustrates a perspective bottom view of a first embodiment of an elongate windshield wiper cover according to one aspect of the present invention.
Figure 6:
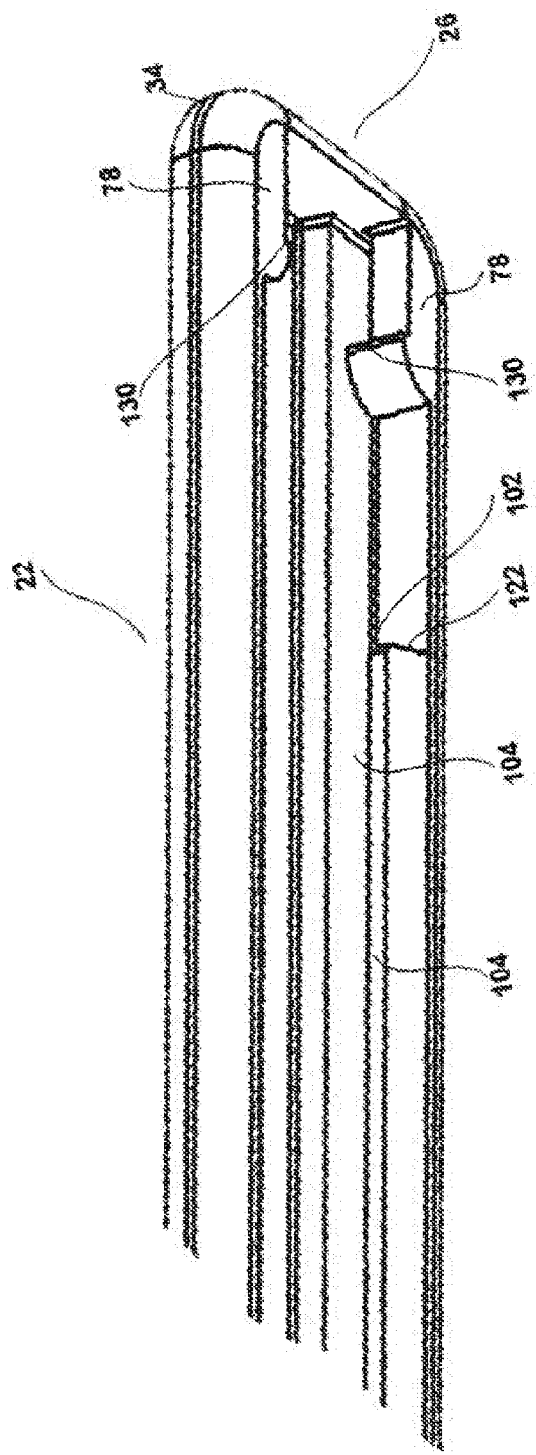
FIG. 6 illustrates a cutaway perspective bottom view of a first embodiment of an elongate windshield wiper cover end according to one aspect of the present invention.
Figure 8:
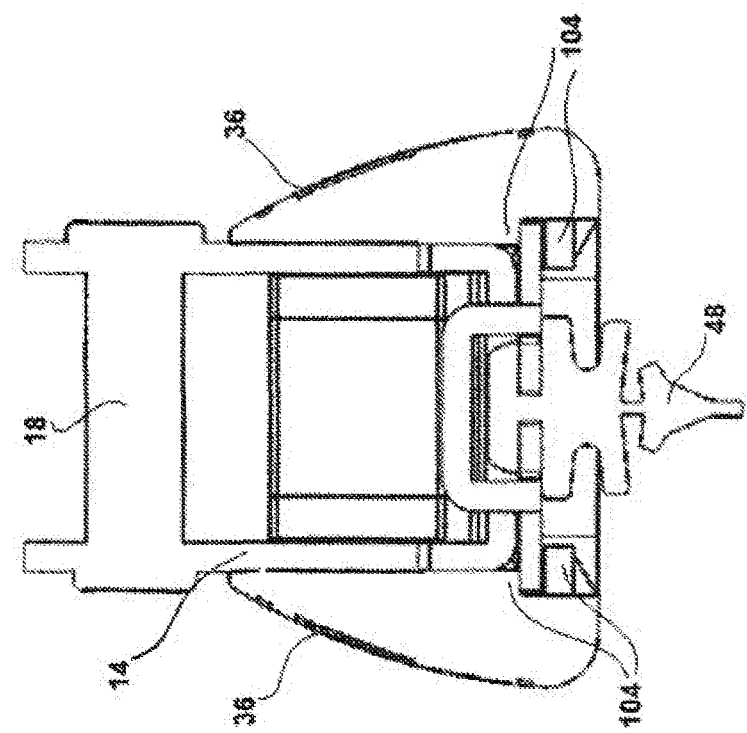
FIG. 8 illustrates a cross-section side view of a first embodiment of a windshield wiper according to one aspect of the present invention.

Referring to the drawings in general, a wiper blade 10 includes a cover 22, a wiper frame assembly 16, a wiper strip 48, mounting base, or other connection device 14, and a raised portion 60. At a central region of cover 22, an integrated collar 36 defines a passageway for receiving the mounting base or other connection device 14. Collar 36 may also has recesses 114 or projections 110 for securing the collar to mounting base, or other connection device 14. The mounting base or other connection device 14, in turn, may secure the wiper blade to a connector 126 and/or adapter and driver arm (not shown) that actuates the wiper blade. Alternatively a connection device 14 may be designed to connect directly to a driver arm. As shown in FIGS. 4 and 6, cover 22 is also provided with end retainers 78. End retainers 78 are used to secure cover ends 26 to the wiper assembly frame 16. As shown in FIGS. 11-12 and 40-41, cover 22 forms a contiguous outer edge or perimeter 56 formed by front edge 32, left end 40, rear edge 34, and right end 36.

Figure 1:
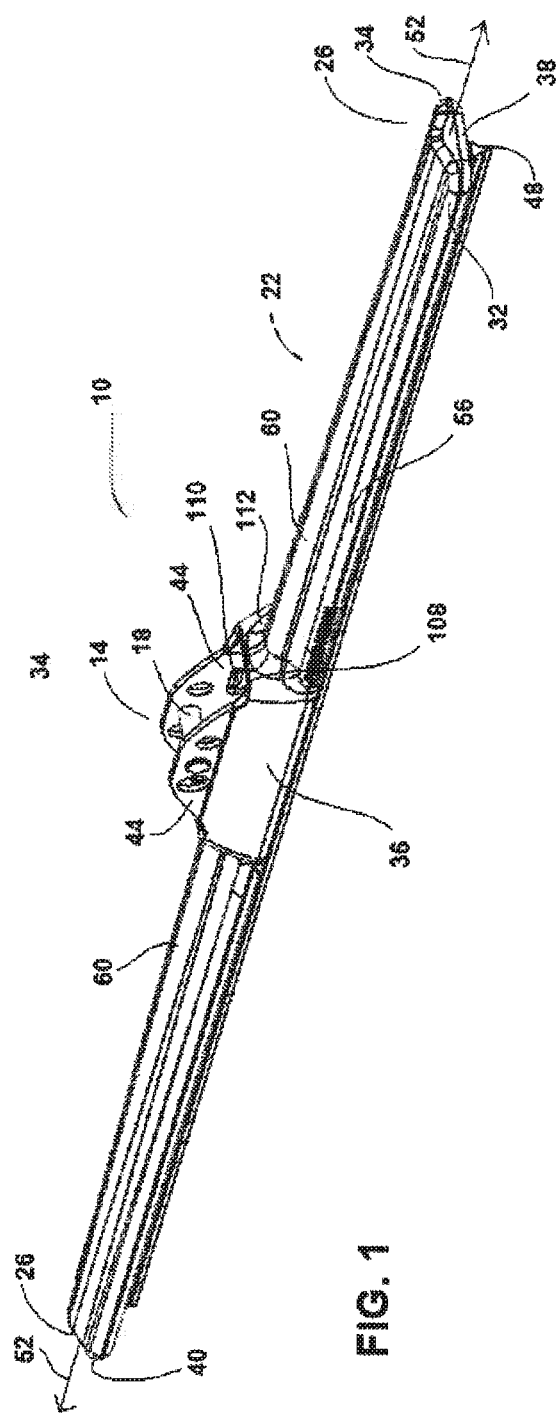
FIG. 1 illustrates a perspective side view of a first embodiment of a windshield wiper having an elongate windshield wiper cover according to one aspect of the present invention.
Figure 2:
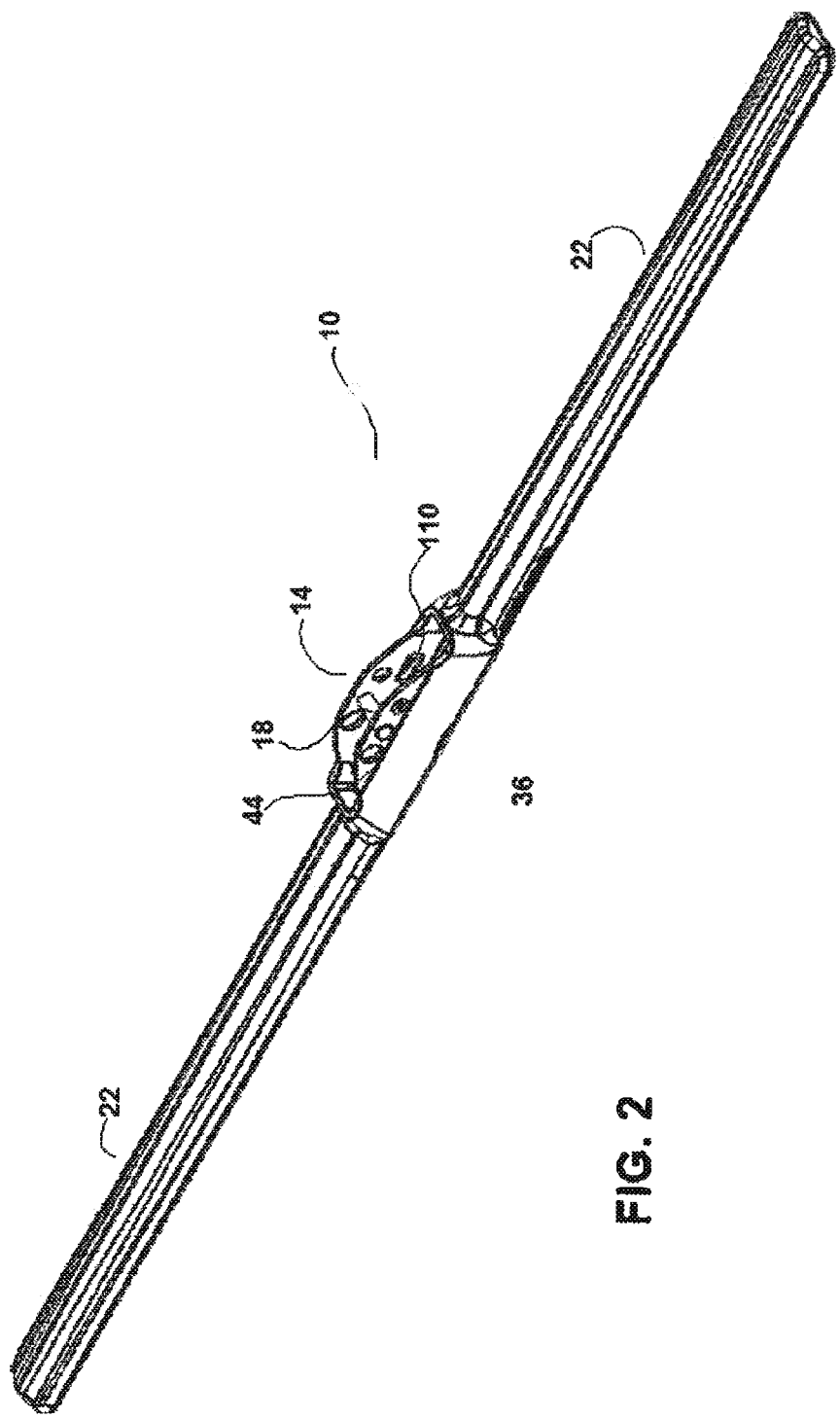
FIG. 2 illustrates a perspective side view of a first embodiment of a windshield wiper having an elongate windshield wiper cover illustrated without a wiper strip according to one aspect of the present invention.
Figure 3:
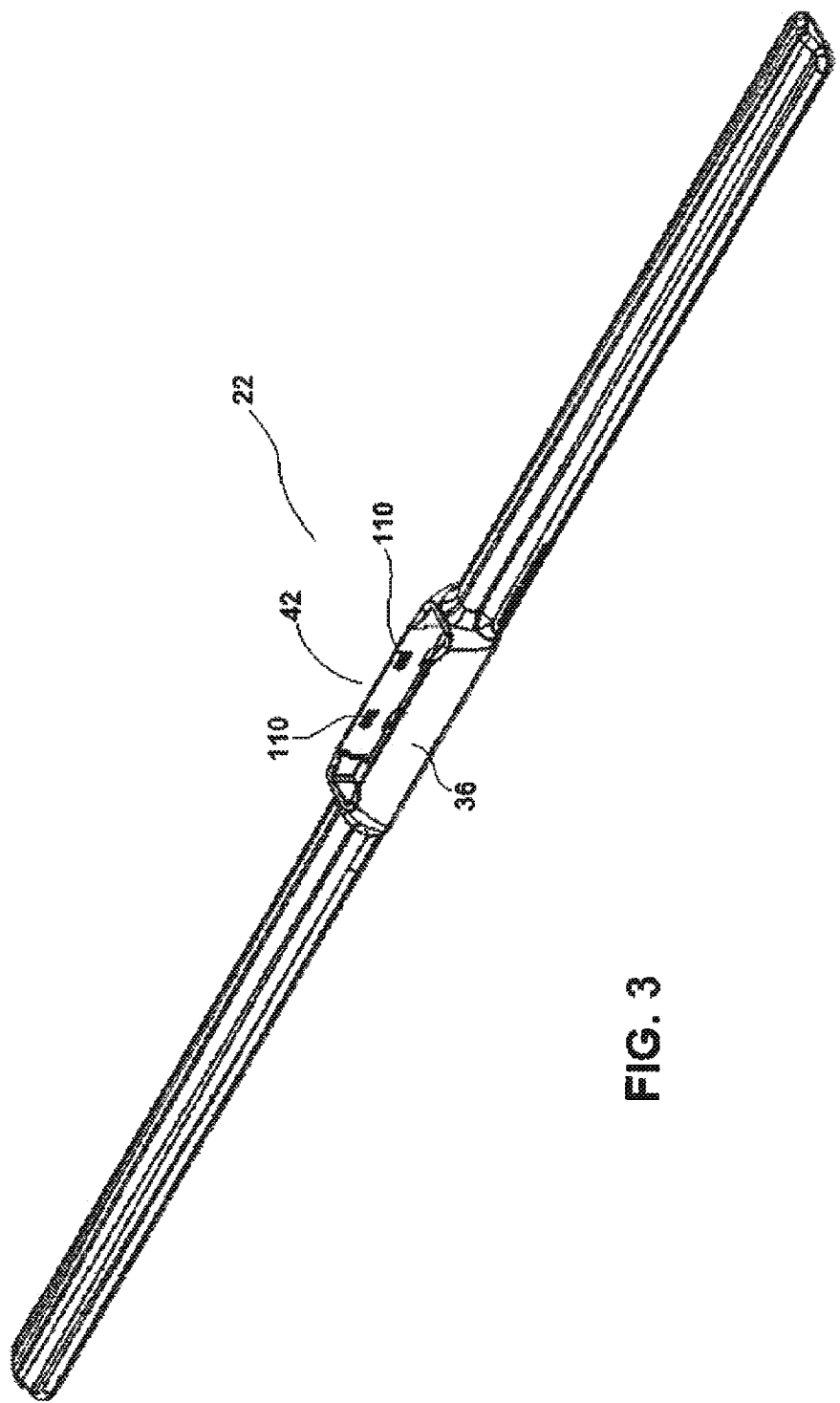
FIG. 3 illustrates a perspective side view of a first embodiment of an elongate windshield wiper cover according to one aspect of the present invention.
Figure 7:
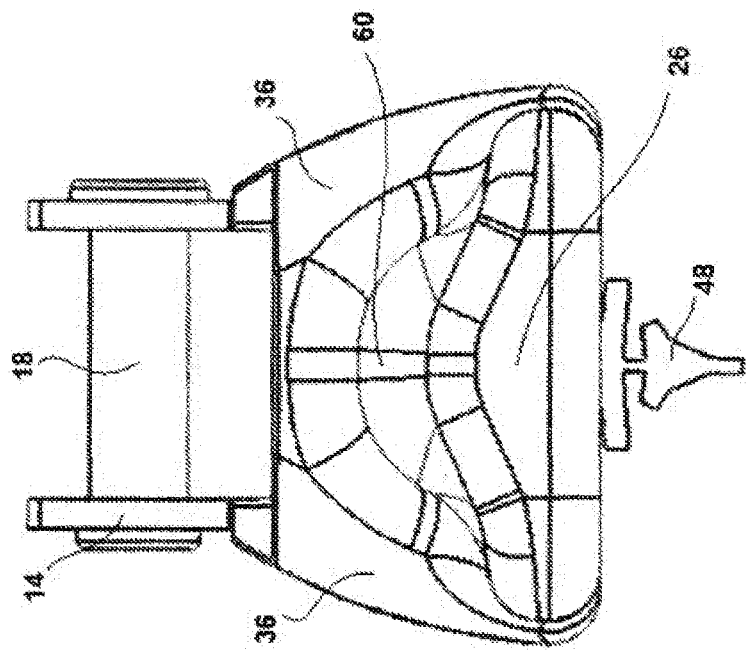
FIG. 7 illustrates a side view of a first embodiment of a windshield wiper having an elongate windshield wiper cover according to one aspect of the present invention.
Figure 9:
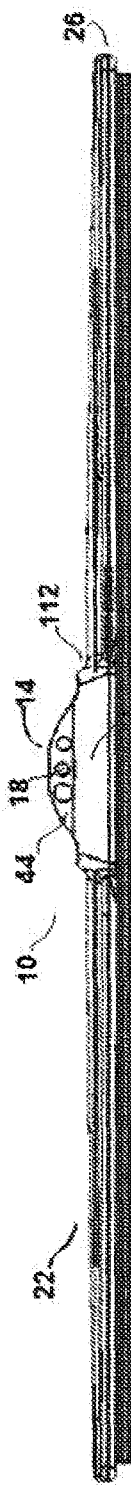
FIG. 9 illustrates a side view of a first embodiment of a windshield wiper having an elongate windshield wiper cover according to one aspect of the present invention.
Figure 10:
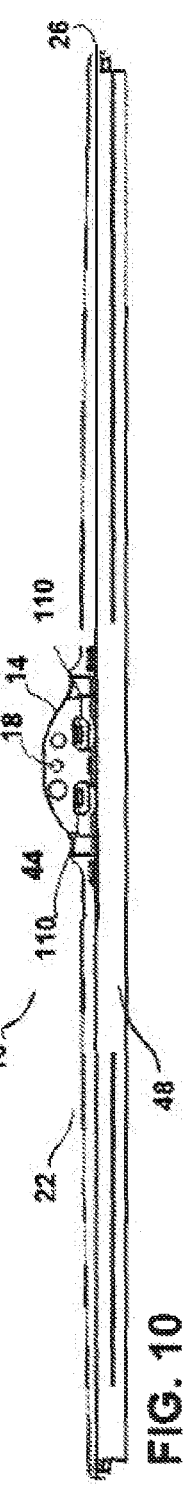
FIG. 10 illustrates a cross-section side view of a first embodiment of an elongate windshield wiper according to one aspect of the present invention.
Figure 11:
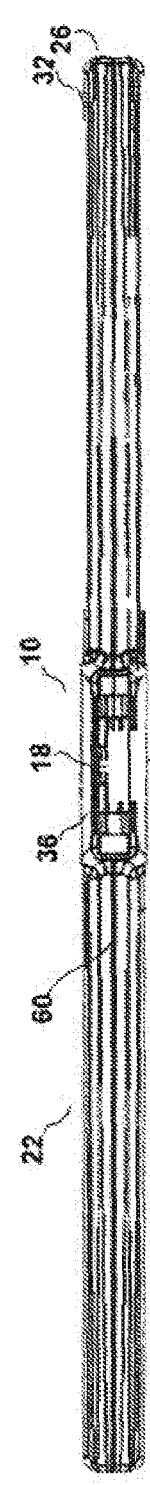
FIG. 11 illustrates a top view of a first embodiment of an elongate windshield wiper according to one aspect of the present invention.
Figure 12:
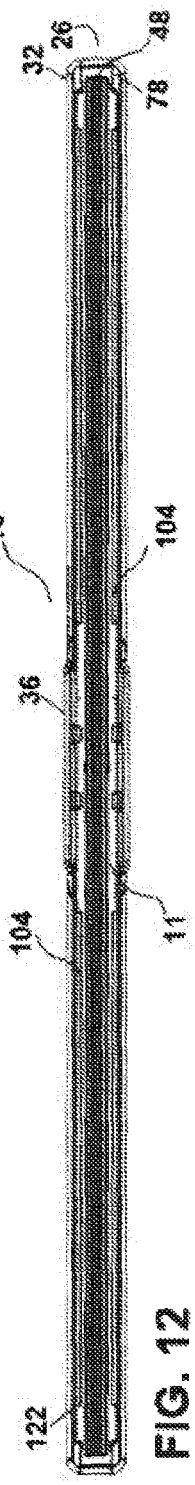
FIG. 12 illustrates a bottom view of a first embodiment of an elongate windshield wiper according to one aspect of the present invention.

FIGS. 1-12 illustrate a low profile embodiment of a wiper blade having a wiper cover with a central collar. In particular, as shown in FIG. 1, windshield wiper 10 has an elongate windshield wiper cover 22 that extends along a longitudinal axis 52. Between each end 26 and collar 36, the upper surface of cover 22 is cambered along its width, thereby reducing or limiting the formation of air vortices, as best illustrated in FIGS. 2, 3 and 7. Further, the cambered surface gently extends upwardly from a relatively low profile at the ends 26 to a steep upward slope 112 at collar 36.

Figure 5:
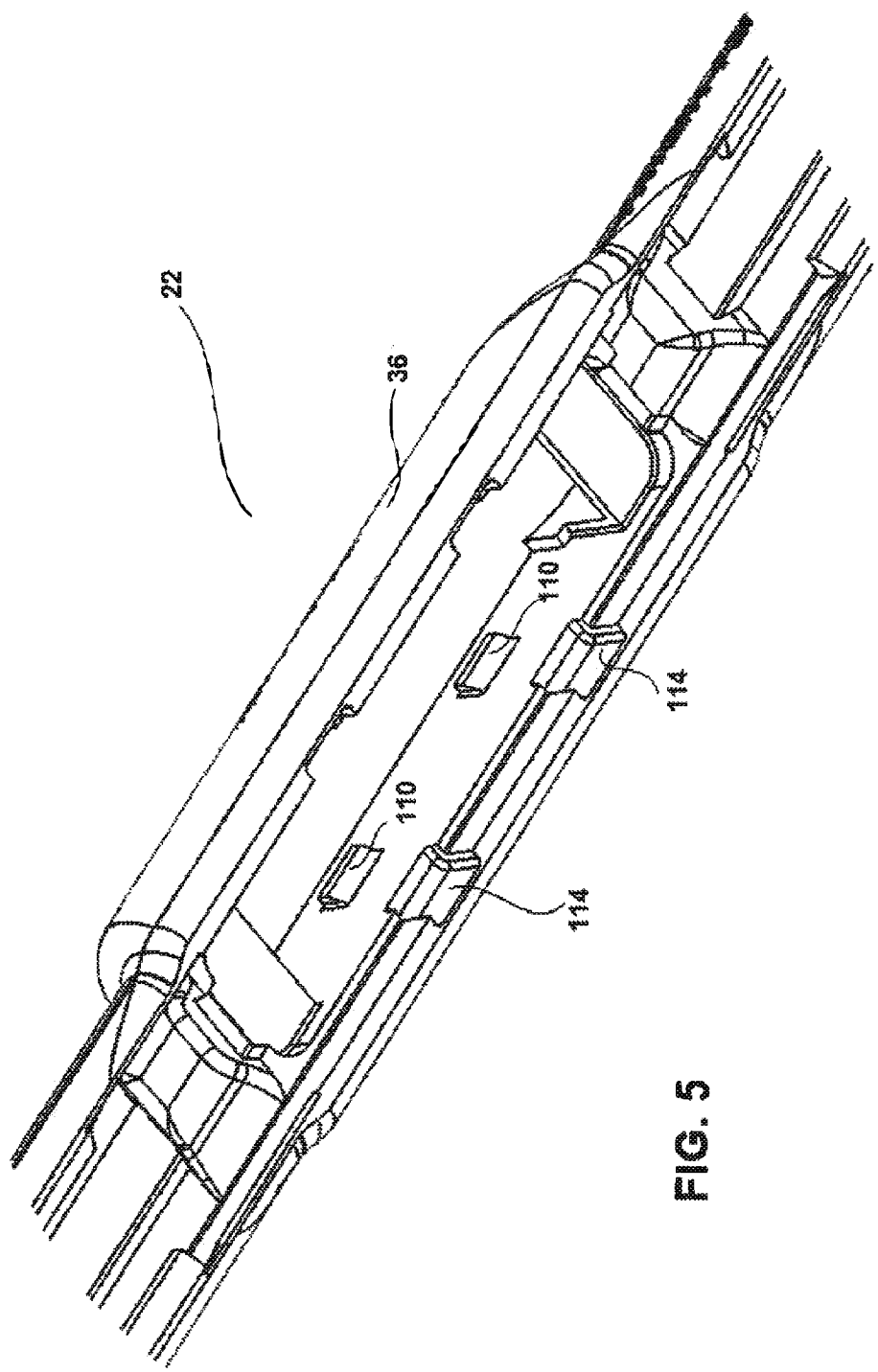
FIG. 5 illustrates a cutaway perspective bottom view of a first embodiment of an elongate windshield wiper cover having a collar according to one aspect of the present invention.
Figure 16:
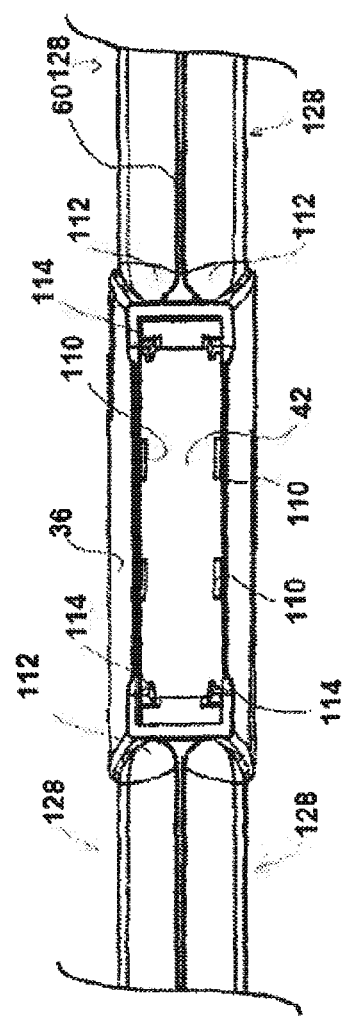
FIG. 16 illustrates a cutaway top view of a second embodiment of an elongate windshield wiper cover according to one aspect of the present invention.
Figure 17:
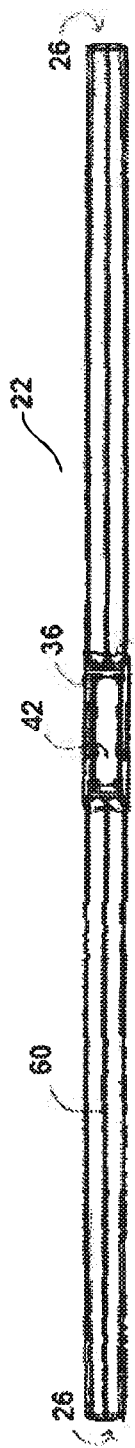
FIG. 17 illustrates a top view of a second embodiment of an elongate windshield wiper according to one aspect of the present invention.
Figure 18:
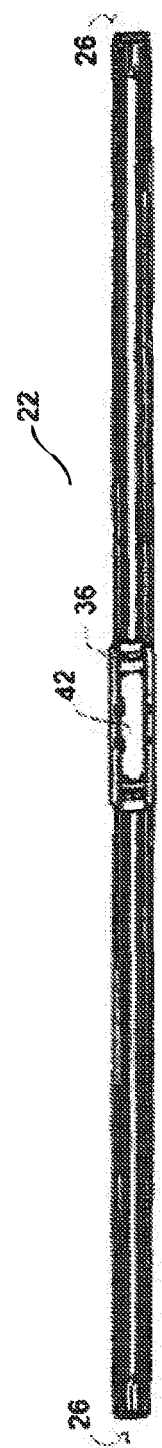
FIG. 18 illustrates a bottom view of a second embodiment of an elongate windshield wiper according to one aspect of the present invention.
Figure 19:
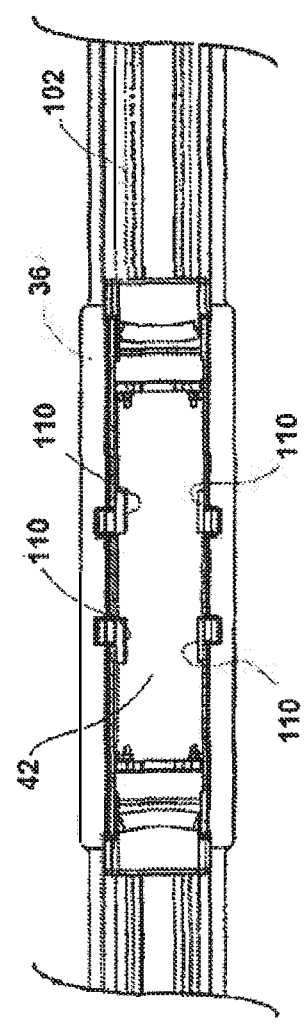
FIG. 19 illustrates a cutaway bottom view of a second embodiment of an elongate windshield wiper cover according to one aspect of the present invention.
Figure 20:
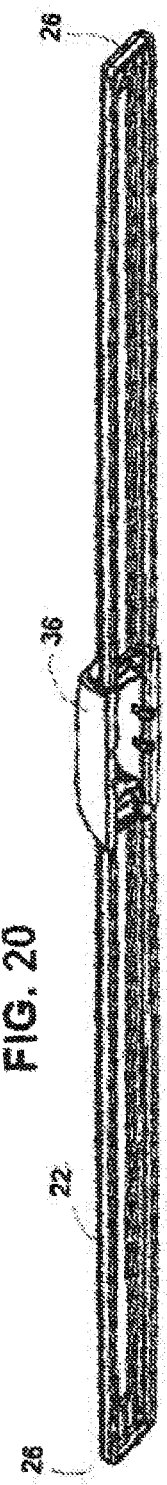
FIG. 20 illustrates a perspective bottom view of a second embodiment of an elongate windshield wiper cover according to one aspect of the present invention.
Figure 21:
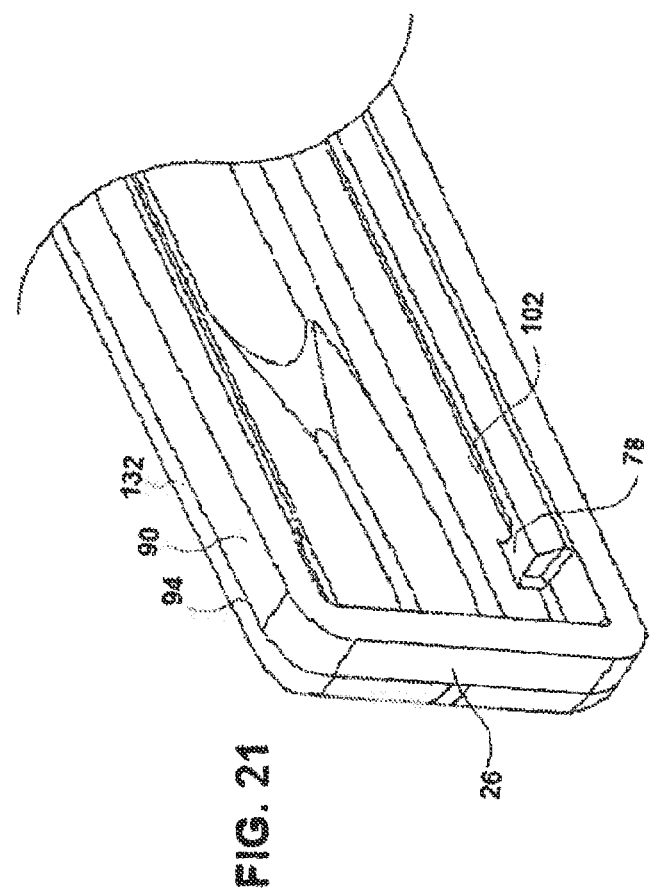
FIG. 21 illustrates a cutaway perspective bottom view of a second embodiment of an elongate windshield wiper cover end according to one aspect of the present invention.

FIGS. 3-5 illustrate collar 36, which is located at an approximate midpoint between ends 26. In general, collar 36 has a rectangular exterior surface with curvilinear contours that limit the formation of wind vortices. Collar 36 forms an interior passageway 42, which receives mounting base or other connection device 14 during assembly of the windshield wiper. In addition, the interior perimeter of collar 36 is provided with a permanent locking cantilevered snap-fit mechanism to partially secure cover 22 to the windshield wiper frame assembly 16. More specifically, as shown in FIG. 5, catches 110 may be designed to engage corresponding slots, recesses, or locators on mounting base or other connection device 14 (FIG. 1). Locators 114 may likewise be provided on the interior perimeter of collar 36 to receive catches from mounting base or other connection device 14, as shown in FIGS. 4 and 16. This snap-fit securing mechanism establishes a close fitting, semi-permanent and durable connection between collar 36 and mounting base or other connection device 14.

Cover 22 may also be attached to wiper frame assembly 16 at cover ends 26 using an end securing mechanism 78. As illustrated in FIG. 6, ends 26 are provided with cantilevered snap fit ends 130 to secure the ends of cover 22 to the wiper frame assembly and limit axial movement of the wiper frame assembly. In addition, cover 22 is stretch-fit and friction fit over the ends of the wiper frame assembly 16. That is, because cover 22 is formed from a polymeric, axially elastomeric material, it can be stretched axially and released over the ends of the wiper frame assembly. Persons of skill in the art will recognize that additional end securing mechanisms, including without limitation dovetails, or extended claws along the entire perimeter of the assembly, or any other suitable method may also be used.

Cover 22 is also attached to wiper frame assembly 16 by longitudinal grooves 102 provided on an interior portion of the wiper cover, as illustrated in FIG. 6. Grooves 102 are formed by parallel rails 104, which are disposed axially along longitudinal axis 52. During assembly, the longitudinal edges of the elongate beam 11 of the wiper frame assembly are mated in a friction fit relationship with longitudinal grooves 102, thus preventing or limiting separation of cover 22 from the wiper frame assembly. The parallel rails 104 may have rail ends 122 which stop before reaching the ends of the cover 26, thereby leaving a gap between the rail ends 122 and the end retainers 78.

Accordingly, as discussed above, cover 22 is secured to the windshield wiper frame assembly 16 at or along three principle sections of the windshield wiper blade to avoid inadvertent detachment of the cover from the wiper frame assembly during use. These attachment sections are between the collar and the mounting base or other connecting device; between the ends of the cover and the ends of the beam or wiper blade frame assembly; and along the axial axis of the cover and the wiper frame assembly.

FIGS. 13-21 illustrate a second embodiment of a wiper blade having a wiper cover 22 with a central collar 36 and a wind deflector 60. A steep upward slope 112 joins collar 36 to wind deflector 60. Slope 112 reduces the formation of noisy wind vortices during operation. Wind deflector 60 is disposed along a central portion of the longitudinal axis of cover 22. In addition, wind deflector 60 includes a sloped region 128 is provided to reduce the size of wind deflector 60 at approximately end 26. As illustrated in FIG. 16, wind deflector 60 forms substantially similar sides 128. As best shown in FIG. 13, sides 128 are provided with chamfers 132 that are joined at seams 94 to a skirt 90. The securing mechanism of cover 22 is substantially identical to that of the embodiment described in detail above.

Figure 22:
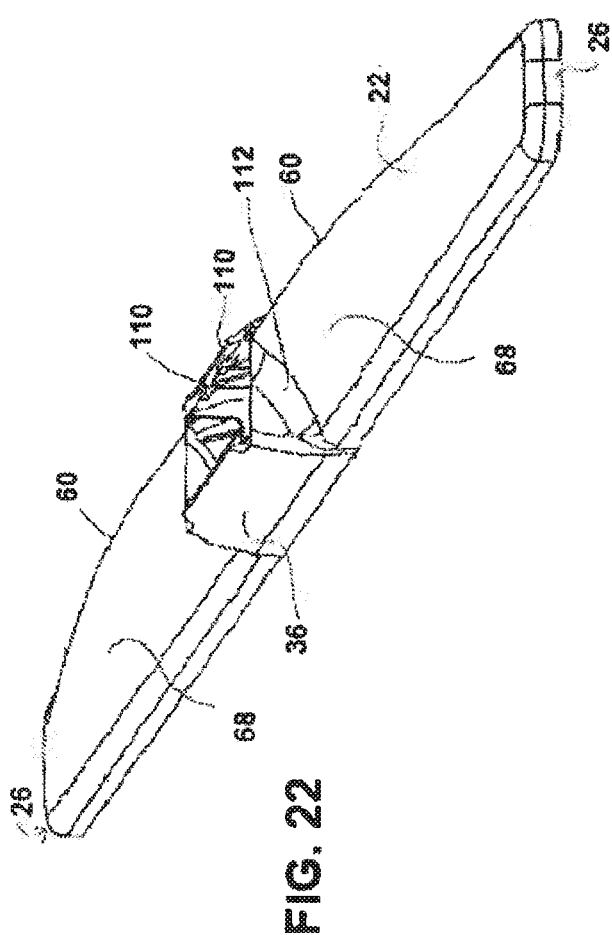
FIG. 22 illustrates a perspective front view of a third embodiment of an elongate windshield wiper cover according to one aspect of the present invention.
Figure 23:
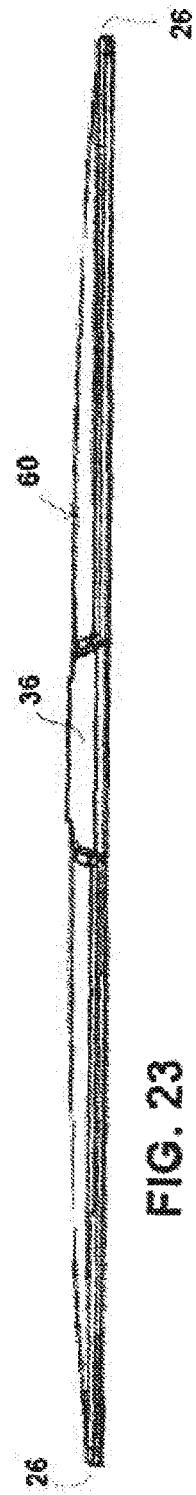
FIG. 23 illustrates a side view of a third embodiment of an elongate windshield wiper cover according to one aspect of the present invention.
Figure 32:
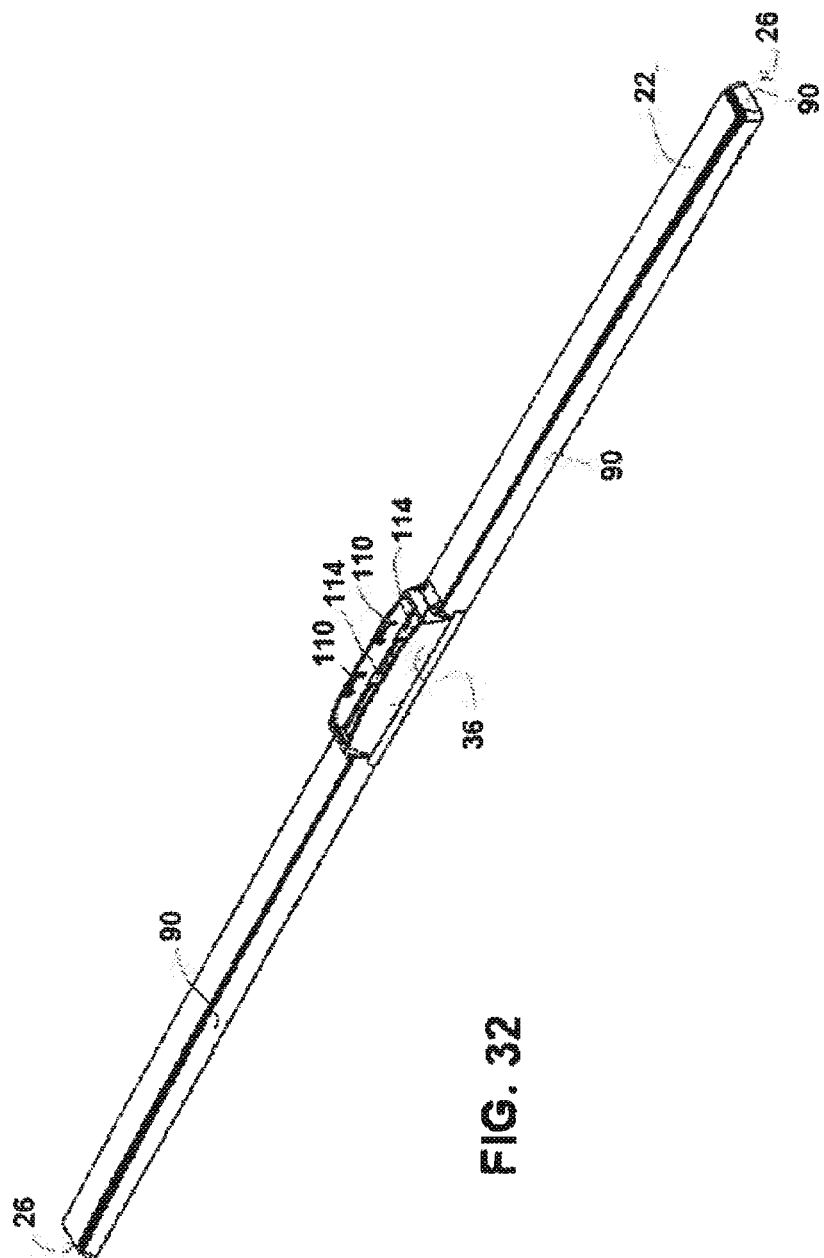
FIG. 32 illustrates a perspective side view of a fourth embodiment of an elongate windshield wiper cover according to one aspect of the present invention.
Figure 35:
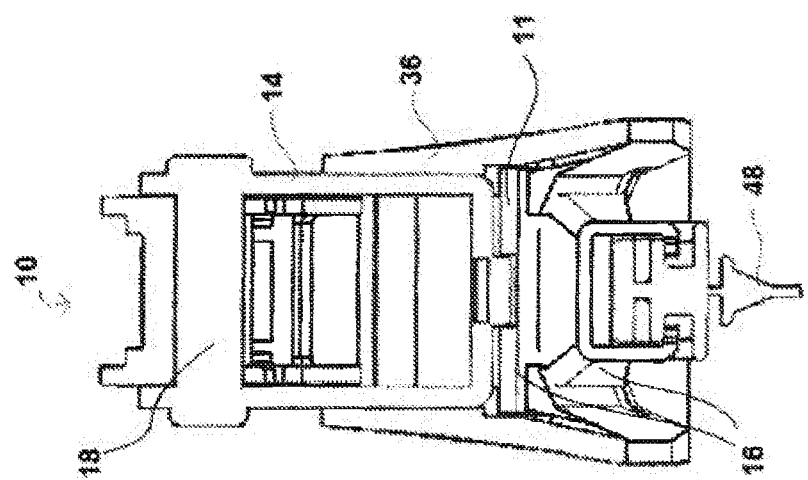
FIG. 35 illustrates a cross-section side view of a fourth embodiment of a windshield wiper according to one aspect of the present invention.
Figure 34:
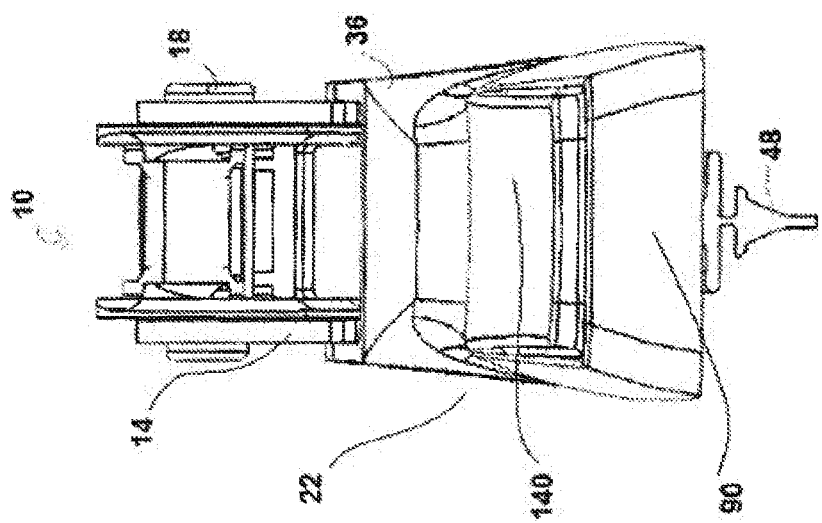
FIG. 34 illustrates a side view of a fourth embodiment of a windshield wiper having an elongate windshield wiper cover according to one aspect of the present invention.

FIGS. 22-28 illustrate a third embodiment of a wiper blade having a wiper cover with a central collar. As best illustrated in FIG. 22, the wind deflector 60 is offset from a central, longitudinal axis of cover 22. The offset wind deflector defines a windward surface 68 that provides a downward force on the wiper blade when in use. The downward force limits separation of the wiper strip from the window during operation. As in previously discussed embodiments, a steep upward slope 112 in collar 36 limits the formation of noisy wind vortices. The securing mechanism of cover 22 is substantially identical to that of the embodiment described in detail above, though again other securing mechanism known in the art may also be used.

FIGS. 29-41 illustrate a fourth embodiment of a wiper blade having a wiper cover 22 with a central collar 36. Wiper cover 22 has a substantially planar skirt 90 that is joined to a planar upper surface 140. Skirt 90 forms the exterior perimeter of cover 22. In addition, chamfers 132 are provided to reduce or limit the formation of noisy air vortices. Steep upward slope 112 is also provided to reduce or limit the formation of noisy air vortices. The securing mechanism of cover 22 is substantially identical to that of the embodiment described in detail above.

It is intended that the foregoing detailed description be regarded as illustrative rather than limiting, and that it be understood that it is the following claims, including all equivalents, that are intended to define the spirit and scope of this invention.

What is claimed:

1. A wiper blade comprising:
   a support structure with outer ends;
   a connection device, and a wiper strip connected to the support structure;
   a unitary elongate cover having an integrated central collar, first and second elongate portions extending from the central collar, the first and second elongate portions having outer ends corresponding with the support structure outer ends;
   a first securing device for securing the central collar to the connection device; and
   an end securing mechanism for securing the outer ends of the cover to the outer ends of the support structure, a portion of the end securing mechanism extending laterally and inwardly to define a protrusion, the outer ends of the cover being secured to the support structure by the end securing mechanism.

2. The wiper blade of claim 1, wherein the support structure is a frame.

3. The wiper blade of claim 1, wherein the support structure is an elongate beam.

4. The wiper blade of claim 1 wherein the unitary elongate cover further comprises a wind deflector.

5. The wiper blade of claim 1, further comprising a first slope connecting the integrated central collar to the first elongate portion and a second slope connecting the central collar to the second elongate portion.

6. The wiper blade of claim 5, wherein the first securing device comprises a tongue configured to snap-fit into a recess defined by the connection device.

7. The wiper blade of claim 5, wherein the first and second elongate portions comprise an elastomeric region.

8. The wiper blade of claim 1, wherein the integrated central collar defines an interior passageway, the interior passageway having a snap-fit tongue.

9. The wiper blade of claim 1, further comprising a pair of substantially parallel longitudinal rails disposed along an inner surface of each of the first and second elongate portion, each of the rails extending from the integrated collar to the outer ends, the pair of rails defining a channel therebetween, the channel dimensioned to receive the elongate beam and secure the first and second elongate portions to the beam, the outer ends enclosing the respective ends of the channel.

10. A windshield wiper cover comprising:
    a support structure having an integrated central collar, first and second elongate portions extending from the integrated central collar, the first and second elongate portions having outer ends; and
    an end retainer defined at the outer ends a portion of which extending laterally and inwardly to define a protrusion, the outer ends of the cover being secured to the support structure by the end retainer.

11. The windshield wiper cover of claim 10, wherein the integrated central collar defines an interior passageway, the interior passageway having a snap-fit tongue.

12. The windshield wiper cover of claim 10, further comprising a pair of substantially parallel longitudinal rails disposed along an inner surface of each of the first and second elongate portions, each of the rails extending from the integrated central collar to the outer ends, the pair of rails defining a channel therebetween, the channel dimensioned to receive an elongate beam, the outer ends enclosing respective ends of the channel.

13. The windshield wiper cover of claim 10, further comprising a wind deflector disposed along the first and second elongate portions.

14. The windshield wiper cover of claim 13, wherein the wind deflector defines a windward side having a first surface area and a leeward side having a second surface area, and wherein the first surface area is greater than the second surface area.

15. The windshield wiper cover of claim 13, wherein the wind deflector defines a perimeter, the perimeter having a chamfered surface.

16. The windshield wiper cover of claim 13, wherein the wind deflector defines a windward side having a first surface area and a leeward side having a second surface area, and wherein the size of the first surface area is similar to the size of the second surface area.

17. The windshield wiper cover of claim 10, wherein the unitary elongate body has at least one elastomeric region.

18. The windshield wiper cover of claim 10, further comprising a chamfer on the first and second elongate portions.

* * * * *